United States Patent [19]
Martinez

[11] Patent Number: 5,957,214
[45] Date of Patent: Sep. 28, 1999

[54] FLYWHEEL FOR A VERTICAL DRIVE SHAFT LAWN EDGER

[75] Inventor: David M. Martinez, Brunswick, Ohio

[73] Assignee: MTD Products Inc, Cleveland, Ohio

[21] Appl. No.: 09/002,207

[22] Filed: Dec. 31, 1997

[51] Int. Cl.$^6$ .................................................. A01B 33/06
[52] U.S. Cl. ............................................ 172/15; 172/123
[58] Field of Search .............................. 172/13, 15, 108, 172/118, 123; 56/256

[56] References Cited

U.S. PATENT DOCUMENTS

| | | | |
|---|---|---|---|
| 3,693,334 | 9/1972 | Lowery | 56/256 X |
| 4,715,169 | 12/1987 | Ould | 56/256 X |
| 5,274,987 | 1/1994 | Wiener | 56/14.8 |
| 5,540,286 | 7/1996 | Helmig | 172/15 |
| 5,857,315 | 1/1999 | Keane | 172/14 X |

OTHER PUBLICATIONS

Mantis "The Mantis–20 Garden and Lawn Care System", Mantis Manufacturing Co., Oct. 1985.

*Primary Examiner*—Christopher J. Novosad
*Attorney, Agent, or Firm*—Emerson & Associates; Roger D. Emerson; John M. Skeriotis

[57] ABSTRACT

A vertical drive shaft lawn edger is disclosed having a non-integral flywheel with the edger engine. This allows for the interchangeability of different flywheels for the same engine or different engines. The flywheel disclosed is preferably a combination flywheel/drive pulley. The flywheel/drive pulley is mounted directly to the drive shaft of the engine. The drive pulley is mounted to the top side or bottom side of the flywheel. Preferably, the flywheel/drive pulley in an integral piece.

6 Claims, 3 Drawing Sheets

FLYWHEEL FOR A VERTICAL DRIVE SHAFT LAWN EDGER

BACKGROUND OF THE INVENTION

I. Field of the Invention

This invention relates to a lawn edger and more specifically, to a flywheel for a vertical drive shaft lawn edger.

II. Description of the Related Art

The present invention contemplates a new and improved vertical drive shaft lawn edger that is simple in design, effective in use, and overcomes the foregoing difficulties and others while providing better and more advantageous overall results. Lawn edgers are widely used in maintaining the appearance of lawns. They are primarily used to trim grass along the edges of driveways and curbs.

The prior art edgers typically use a horizontal output shaft that rotates a vertical cutting blade. A vertical drive pulley rotates a vertical driven pulley through a V-belt. The driven pulley rotates a vertical edger blade, which has a horizontal rotational axis. A vertical drive shaft engine has a horizontal driven pulley with a vertical rotational axis. In this arrangement, the V-belt is oriented to translate the vertical axis rotation of the drive pulley to the horizontal axis rotation of the driven pulley.

The horizontal drive shaft engine configuration is preferred since the pulleys and blade are oriented uniformly. However, lawn edgers with a horizontal drive shaft engine are very expensive. Lawnmower engines utilize a vertical drive shaft engine for obvious reasons and are less expensive. Lawnmower engines are manufactured in greater quantities and are less expensive. Therefore, lawn edgers utilizing a vertical drive shaft are desirable.

Prior art vertical drive shaft lawn edgers use engines that have a flywheel mounted to the drive shaft. The manufacturers of engines mount the flywheel to the drive shaft prior to shipping the engine to the manufacturer of the edger. Replacement of the flywheel often leads to replacing the engine. Therefore, when a flywheel becomes damaged during use a new engine is needed. Also, if a larger or smaller flywheel is needed, there is no interchangeability by the edger manufacturer. The edger manufacturer provides the output specifications to the engine manufacturer. Thereafter, the engine manufacturer produces an engine which meets the requirements given by the edger manufacturer.

SUMMARY OF THE INVENTION

In accordance with the present invention, a new and improved vertical drive shaft lawn edger is provided which allows for the removal and replacement of a flywheel to the drive shaft of the engine.

A lawn edger having an engine with a vertical drive shaft is disclosed. A lawn edger has a flywheel that is removable and mountable to the vertical drive shaft of the engine. The flywheel and drive pulley can be an integral piece. The flywheel can be rigidly attached to the vertical drive shaft of the engine. The flywheel can be mounted above or below the drive pulley.

The drive pulley is mounted to the vertical drive shaft of the engine. A driven pulley is driven by the drive pulley. A V-belt extends around the driven pulley and the drive pulley.

A frame having front, side and rear portions, and a center hole is also disclosed. The center hole accepts the engine which is mounted to the frame. An edging means is also mounted to the frame, preferably the front portion. The edging means has a blade with a horizontal rotational axis.

Still other benefits and advantages of the invention will become apparent to those skilled in the art upon a reading and understanding of the following detailed specification.

BRIEF DESCRIPTION OF THE DRAWINGS

The invention may take physical form in certain parts and arrangement of parts. A preferred embodiment of these parts will be described in detail in the specification and illustrated in the accompanying drawings, which form a part of this disclosure and wherein.

DESCRIPTION OF THE PREFERRED EMBODIMENT

Figure 1:
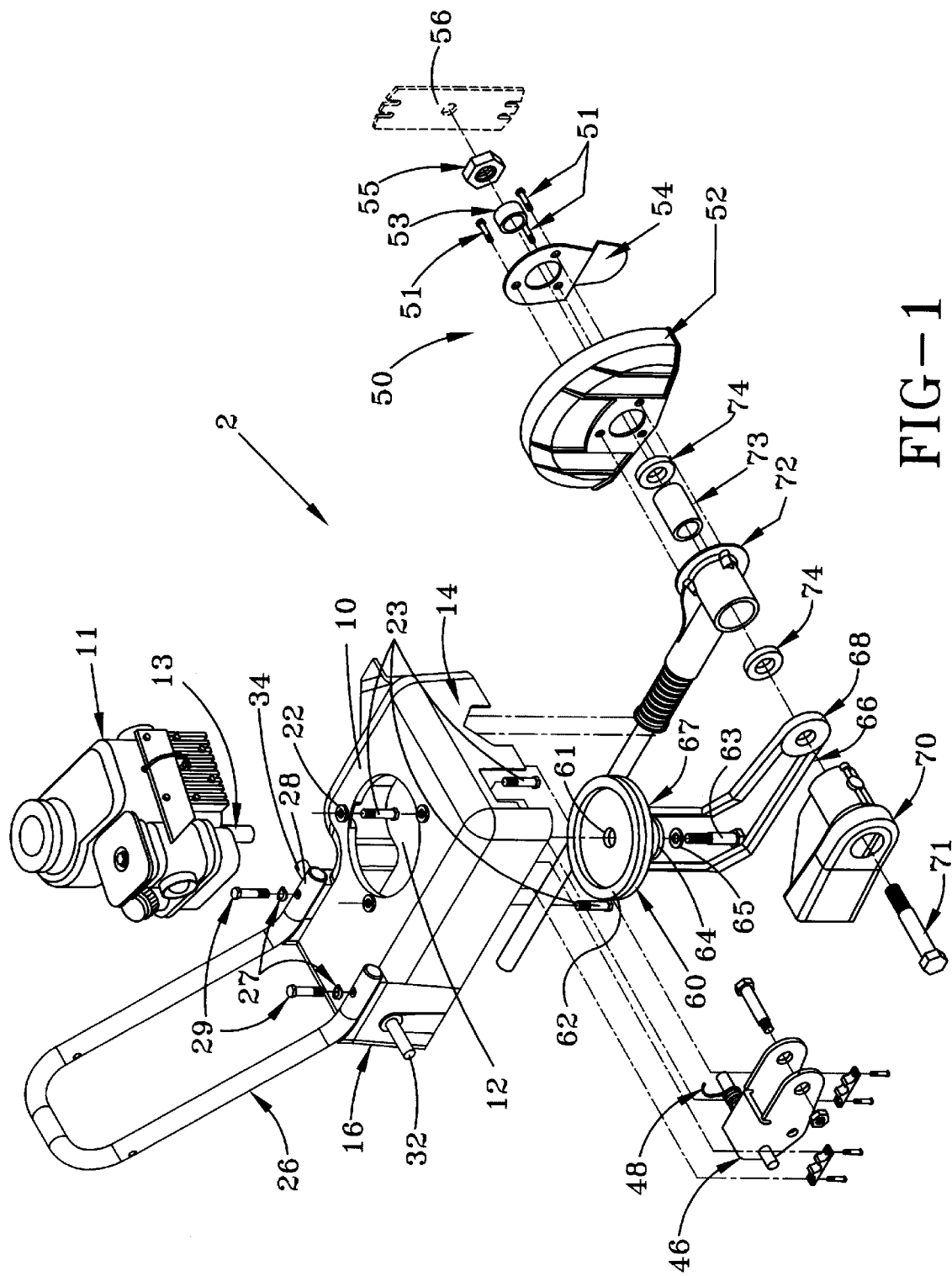
FIG. 1 is an exploded perspective view of the present invention.

Referring now to the drawings, which are for purposes of illustrating a preferred embodiment of the invention only, and not for purposes of limiting the invention, FIG. 1 shows an exploded perspective view of a vertical drive shaft lawn edger 2. The vertical drive shaft edger 2 has a frame 10 that accepts an engine 11 within a center hole 12. The frame 10 supports the engine 11 and has downturned front and rear portions 14, 16.

Figure 2:
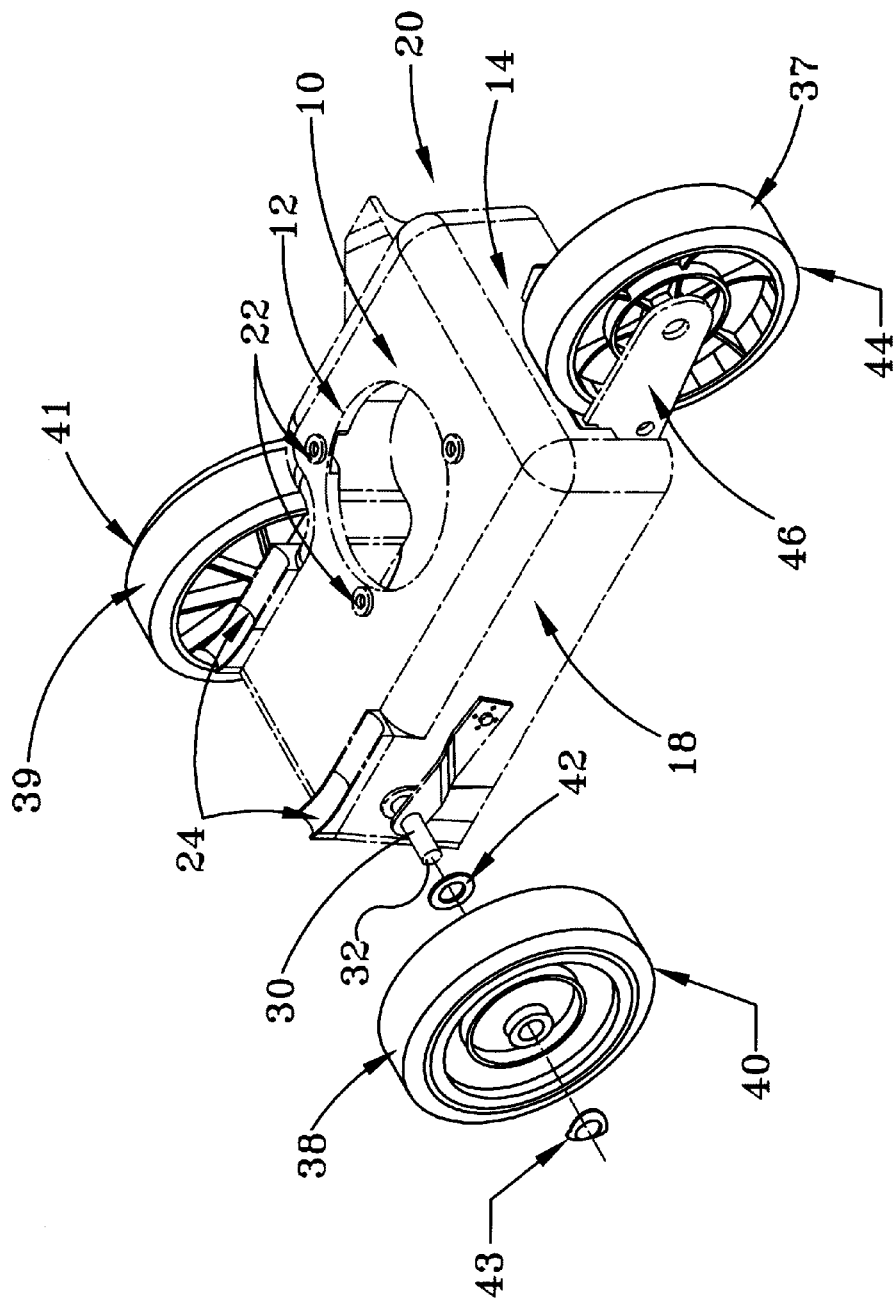
FIG. 2 is a perspective view showing the front and rear wheels attached to the frame.

With reference to FIG. 2, a rear axle 30 extends through the side portions 18, 20 of the frame 10. The rear axle 30 has first and second ends 32, 34. A set of rear wheels 40, 41 are mounted to the axle 30 using a washer 42 and push cap 43. A front wheel 44 is pivotally mounted to the frame 10 by a pivotal mounting bracket 46. The front wheel 44 is displaced longitudinally and latitudinally with respect to a longitudinal line travelling through the midpoint of the rear axle 30. The midpoint is located halfway between the first and second ends 32, 34. In the preferred embodiment, outer peripheries 38, 39 of the rear wheels 40, 41 are equal to the outer periphery 37 of the front wheel 44.

With reference to FIG. 1, the engine 11 mounts to the frame 10 via engine mounts 22 and is secured by screws 23. A vertical drive shaft 13 of the engine 11 extends vertically downward within the hole 12 of the frame 10. A drive pulley 64 is mounted to the drive shaft 13 and includes a V-belt 66 to drive an edging means 50. The drive shaft 13 drives the drive pulley 64 as well as the later-described flywheel 62.

The operator controls the movement of the lawn edger by a handle 26. The frame 10 has handle rest portions 24 whereby arms 28 of the handle 26 are mounted. Screws 29 along with saddle washers 27 secure the arms 28 to the frame 10.

The edging means 50 comprises a blade guard 52, a blade guide 54 and blade 56. The blade guide 54 is secured to the blade guard 52 by screws 51. A spacer 53, a screw 71 and nut 55 secure a belt edger guard 70, the driven pulley 68, the bearing housing 72, the blade guard 52 and the blade guide 54 as a unit.

The engine 11 has a vertical drive shaft 13 that extends into a center hole 61 of a combination flywheel/pulley 60. The flywheel/pulley 60 is securely mounted to, and rotated by, the drive shaft 13. The flywheel/pulley 60 comprises the flywheel 62 and the drive pulley 64. In the preferred embodiment, the pulley 64 is located below the flywheel 62. The pulley 64 is mounted to the bottom 67 of pulley 64. Also, in the preferred embodiment, the flywheel/pulley combination 60 is an integral piece. However, the flywheel 62 and pulley 64 can be individually mounted, as separate pieces, to the drive shaft 13.

The V-belt 66 extends around the drive pulley 64 and around a driven pulley 68. The drive pulley 64, through the use of the V-belt 66, drives the driven pulley 58. Therefore, the power from the engine 11 is transmitted via the drive shaft 13 to the drive pulley 64 to the driven pulley 68 and thereafter to the edging means 50. The edging means 50 contains a blade 56 which performs the cutting for the edger 2. The blade 56 is contained within the edging means 50. The driven pulley 68 and a portion of the belt 66 are contained within a belt edger guard 70. The belt edger guard 70 protects the driven pulley 68 as well as a substantial portion of the belt 66 from flying debris and the like. A screw 71 secures the belt edger guard 70 to the driven pulley 68. The edging means 50 is secured to a bearing housing 72. A spacer 73 and bearings 74 are seated within the bearing housing 72.

The combination flywheel/pulley 60 is a separate item and is mounted on the drive shaft 13. A screw 63 and washer 65 secure the flywheel/pulley 60 to the drive shaft 13. The flywheel/pulley 60 is rigidly mounted to the drive shaft 13. The flywheel/pulley 60 must be mounted to the drive shaft 13 so as to rotate with the drive shaft 13 and to drive the drive pulley 64 and thereafter, the edging means 50. Therefore, in addition to screws 63 and washers 65, the flywheel/pulley 60 is mounted by methods known within the art, such as welding, etc. Since the flywheel/pulley 60 is removable, it is also replaceable.

Unlike the prior art, the flywheel/pulley 60 is not attached to the drive shaft 13 by the engine manufacturers. Rather, the flywheel/pulley 60 is mounted by the edger manufacturer. This leads to interchangeability of flywheels and/or pulleys whose selection may depend upon various factors, such as, the size or horsepower of the engine 11. In addition, by not requiring the flywheel/pulley 60 to be permanently attached to the drive shaft 13, the flywheel/pulley 60 can be replaced when worn or inoperative.

Figure 3:
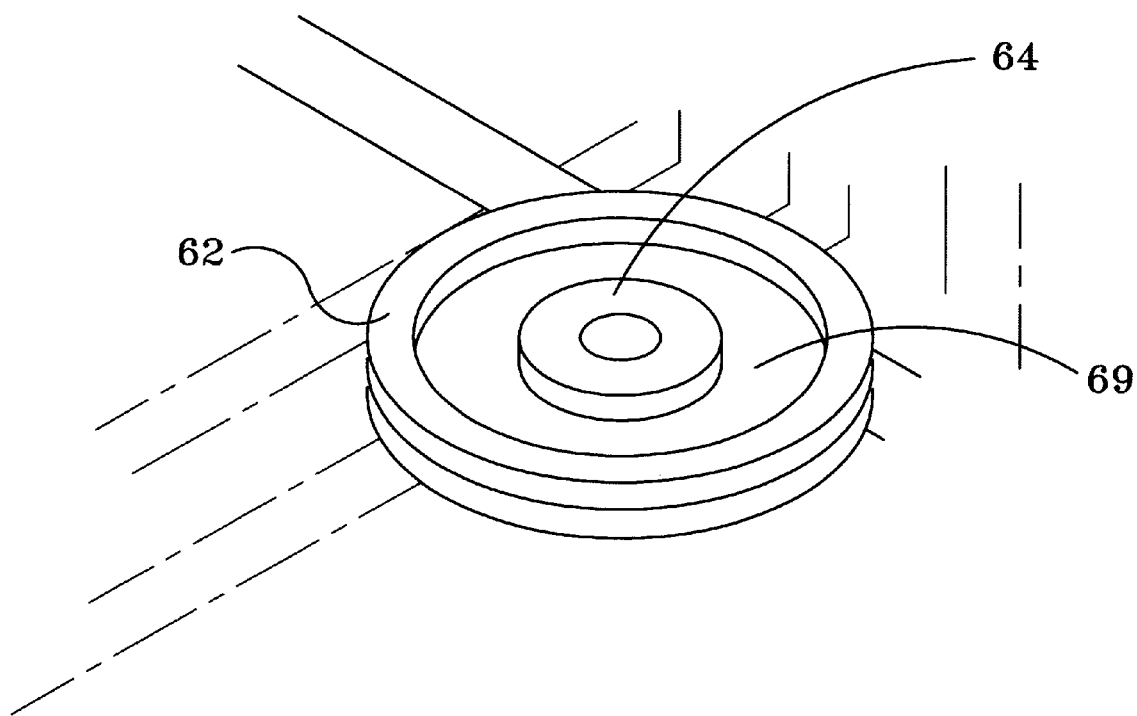
FIG. 3 is a perspective view of an alternative embodiment of the present invention.

In its preferred embodiment, the combination flywheel/pulley 60, has the drive pulley 64 mounted to the bottom 67 of the flywheel 62. However, where more distance is needed between the drive shaft 13 and the flywheel 62, the drive pulley 64 can be mounted to the top side 69 of the flywheel 62, as shown in FIG. 3.

The invention has been described with reference to the preferred embodiment. Obviously, modifications and alterations will occur to others upon a reading and understanding of the specification. It is intended by applicant to include all such modifications and alterations insofar as they come within the scope of the appended claims or the equivalents thereof.

Having thus described the invention, it is now claimed:

1. A lawn edger, comprising:

an engine with a vertical drive shaft;

a flywheel removable and mountable to said vertical drive shaft of said engine;

a drive pulley mounted to said vertical drive shaft of said engine;

a driven pulley, said driven pulley driven by said drive pulley;

a V-belt extending around said driven pulley and said drive pulley;

a frame having a front portion and a center hole, said center hole accepting said engine;

an edging means mounted to said front portion of said frame, said edging means having a blade, said blade having a horizontal rotational axis; and, wherein said flywheel and drive pulley are an integral piece.

2. The lawn edger as recited in claim 1 wherein said flywheel is rigidly attached to said vertical drive shaft of said engine.

3. The lawn edger as recited in claim 1 wherein said flywheel is mounted above said drive pulley.

4. The lawn edger as recited in claim 1 wherein said flywheel is mounted below said drive pulley.

5. The lawn edger as recited in claim 1 wherein said flywheel is mounted above said drive pulley.

6. The lawn edger as recited in claim 1 wherein said flywheel is mounted below said drive pulley.

* * * * *